United States Patent [19]

D'Arcy et al.

[11] Patent Number: 5,305,377
[45] Date of Patent: Apr. 19, 1994

[54] APPARATUS FOR PROVIDING AN ISDN TO ANALOG INTERFACE

[75] Inventors: Paul D'Arcy, Sunnyvale; Robert Sloan, Los Altos Hills; David Evans, Mountain view, all of Calif.

[73] Assignee: Sun Microsystems, Inc., Mountain View, Calif.

[21] Appl. No.: 677,115

[22] Filed: Mar. 29, 1991

[51] Int. Cl.$^5$ .............................................. H04J 3/12
[52] U.S. Cl. ..................... 379/399; 379/339; 370/32; 370/110.1
[58] Field of Search ............... 379/399, 339, 404, 221, 379/222, 93, 94; 370/110.1, 60.1, 30, 94.1; 375/5

[56] References Cited

U.S. PATENT DOCUMENTS

| | | | |
|---|---|---|---|
| 4,759,059 | 7/1988 | Christensen | 379/399 |
| 4,922,484 | 5/1990 | Yoshida et al. | 370/68.1 |
| 4,947,483 | 8/1990 | Dirr | 370/32 |
| 5,018,141 | 5/1991 | Kim | 370/110.1 |
| 5,119,365 | 6/1992 | Warner et al. | 379/404 |
| 5,134,611 | 7/1992 | Steinka et al. | 375/5 |

FOREIGN PATENT DOCUMENTS

DE35349-18A1  4/1987  Fed. Rep. of Germany .

OTHER PUBLICATIONS

Article entitled: Study on Subscriber Line Circuits Applicable for Analog Telephone and ISDN Interfaces; Satoru Fujii, Yukinao Hashitsume, Takaaki Ozeki and Toshiyuki Tahara; IEEE International Conference on Communications, Boston, 1989.
Article entitled: Evaluation Kits and Real-World Test Beds Fertilize ISDN Environment; Milt Leonard, Electronic Design, Apr. 26, 1990.

Primary Examiner—James L. Dwyer
Assistant Examiner—M. Shehata
Attorney, Agent, or Firm—Blakely, Sokoloff Taylor & Zafman

[57] ABSTRACT

An interface for translating signals from a ISDN terminal to an analog telephone terminal including apparatus for separating ISDN signals into control and data signals, apparatus for utilizing the control signals to generate tone signals for transfer to a telephone line, apparatus for translating the digital control signals into signals controlling the transfer of data from digital to analog form, apparatus for translating digital signals in ISDN format into analog signals under control of the apparatus for translating the digital control signals into signals controlling the transfer of data from digital to analog form, apparatus for translating control signals in analog tone format to digital signals for controlling the transfer of signals to an ISDN terminal, apparatus for using the control signals for controlling the transfer of data from analog to digital form, and apparatus for translating analog signals into digital signals in ISDN format under control of the digital signals for controlling the transfer of signals to an ISDN terminal.

8 Claims, 1 Drawing Sheet

APPARATUS FOR PROVIDING AN ISDN TO ANALOG INTERFACE

HISTORY OF THE PRIOR ART

1. Field of the Invention

This invention relates to digital signaling circuitry and, more particularly, to apparatus for converting signals between ISDN and analog telephone signaling formats.

2. History of the Prior Art

There has been a strong move over the last few years to make telephone switching systems capable of handling signal information of all kinds. To allow this to happen, Integrated Services Digital Network (ISDN) has been proposed and is being implemented. The ISDN system is (as its name suggests) a digital system capable of carrying a much larger bandwidth of signals much faster than can analog systems. Today, ISDN systems have been installed in Japan, Australia, and some European countries. The conversion of telephone transmission systems in the United States has been slower because of the very large investment which presently exists in analog telephone systems and peripheral equipment.

An ISDN system is capable of handling digital transmission of signals over a very broad range. For example, telephone, facsimile, telegraph, video, voice mail, and other digital signals can all be carried by the lines of such a system. Such a system is especially useful for the transmission of computer information such as that presently transferred over modems to the analog telephone lines. Consequently, it would be quite useful for certain types of equipment to be prepared to use the ISDN network when it becomes available. For this reason, manufacturers may provide equipment which includes an interface to meet the ISDN standards so that the equipment may be immediately ready for the ISDN market as it develops. If equipment is presently designed to handle ISDN signals, it would be very desirable to permit such equipment to connect to the presently available analog telephone circuitry by means of the very capable ISDN path being provided and to make use of some of the digital information presently available.

SUMMARY OF THE INVENTION

It is, therefore, an object of the present invention to enable electronic equipment to connect to analog telephone lines through ISDN terminals.

It is another more specific object of the present invention to provide an ISDN-to-analog telephone interconnection arrangement.

These and other objects of the present invention are realized in an interface from a ISDN terminal to an analog telephone terminal comprising means for separating ISDN signals into control and data signals, means for utilizing the control signals to generate tone signals for transfer to an analog telephone line, means for using the control signals to control the transfer of data, means for translating digital signals in ISDN format into analog signals, and means for shifting the level of analog signals generated by the means for translating digital signals in ISDN format into analog signals to a level appropriate to provide analog telephone signals.

These and other objects and features of the invention will be better understood by reference to the detailed description which follows taken together with the drawings in which like elements are referred to by like designations throughout the several views.

NOTATION AND NOMENCLATURE

Figure 1:
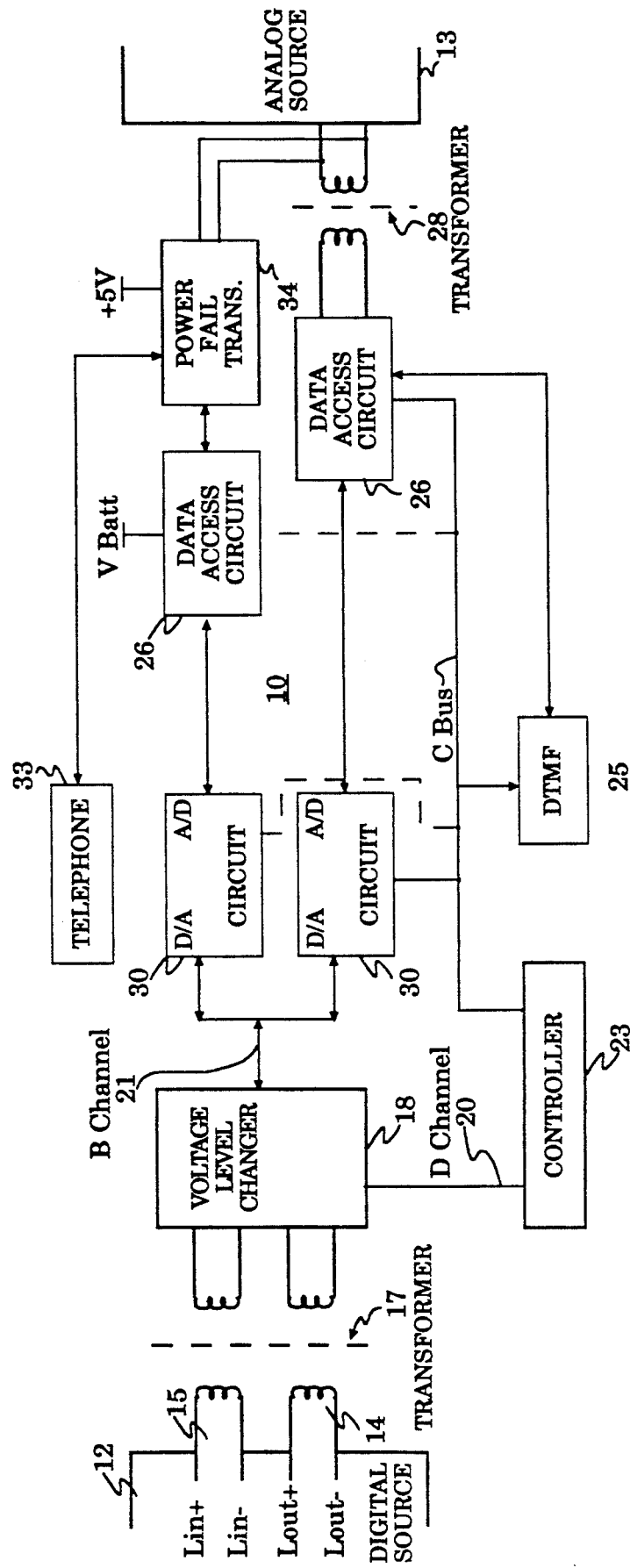
FIG. 1 is a block diagram of an ISDN to analog interface constructed in accordance with the invention.

Some portions of the detailed descriptions which follow may be presented in terms of operations on data bits within a computer memory. These descriptions and representations are the means used by those skilled in the data processing arts to most effectively convey the substance of their work to others skilled in the art. These descriptions and representations often involve steps requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a machine and the method of computation itself should be borne in mind.

DETAILED DESCRIPTION OF THE INVENTION

Referring now to FIG. 1, there is illustrated an interface system 10 in accordance with the present invention. The system 10 is positioned between a piece of equipment 12 ("digital source") providing signals in ISDN format such as a computer and some piece of equipment 13 ("analog source") such as the conventional wall output terminals of a telephone system providing signals in conventional analog telephone format. The signals provided at the equipment 12 in ISDN format are to be transmitted by the equipment 13, and the signals provided at the equipment are to be transmitted for use by the ISDN equipment 12.

The signals from the equipment 12 appear on Lout terminals and signals to the equipment 12 appear on Lin terminals and are transferred by a transformer 17 to and from a circuit 18. The circuit 18 is essentially a voltage level changer, a circuit well known in the art, which transfers signals from the equipment 12 at the appropriate level for ISDN into signals at the appropriate level for transfer to the analog system, and transfers signals from the analog system to signals at the appropriate level for ISDN use. The circuit 18 also separates the control information in the signals from the data and transfers them along separate paths when the signals are going toward the analog equipment; alternatively, the circuit 18 combines the control and data signals furnished from the analog system for ISDN use. A particular circuit for accomplishing these functions is manufactures by Siemens and designated PEB 2085, ISAC-S.

The signals generated at the circuit 18 in response to input signals from the ISDN equipment 12 are placed on either a D channel 20 or a B channel 21 by the circuit 18. The ISDN protocol designates the characteristics of these channels and provides that a D channel shall be capable of transmitting signals at 16 Kbits/second and a B channel shall be capable of handling signals at 64 Kbits/second. All ISDN systems are required to include these channels. These channels are sufficient to transmit the normal analog telephone signals. A second B channel may also be included to provide a broader bandwidth for the transmission of digital signals; such a second channel is illustrated in FIG. 1 and is connected to the control circuitry by dotted lines. In the ISDN format, the D channel handles the control signal information necessary for establishing and maintaining connections while the B channels are used for transferring data. Typical control signal information includes the number being called, a ring signal, on-hook, busy, bad number, connected, type of call (voice, data), and off-hook signals.

The control signals furnished to the D channel 20 are transferred to a controller 23 which may be a microcontroller such as a 80C51 microcontroller manufactured by Intel Corporation. The controller 23 utilizes the digital control signals from the ISDN equipment 12 to produce control signals which may be used for causing the analog equipment to respond. The signals from the controller 23 are transferred on a C bus for controlling a DTMF transceiver circuit 25 which produces the tone signals necessary for transfer on analog telephone lines to produce the number being called, the ring signal, the on-hook, and the off-hook signals. A typical DTMF circuit 25 is manufactured by Sierra Semiconductor and designated part number SC11290.

These control signals produced by the circuit 25 are transferred first to a data access arrangement circuit 26. The circuit 26 protects against the transfer of hazardous voltage to the analog system and places the actual tone signals on one side of a transformer 28 connected to the equipment 13. A particular data access arrangement circuit 26 includes part number MH 88630 manufactured by Mitel which simulates a ring and a relay switch manufactured by Omron as part number TN2E-5V.

In the reverse direction, control signals from the analog equipment 13 are sent via the transformer 28 and the data access arrangement circuit 26 to the DTMF circuit 25 where the analog tones are converted to digital signals for the controller 23. These signals are transferred from the controller 23 to the circuit 18 and from there to the equipment 12 by the transformer 17.

After the appropriate control signals have been transferred by the D channel to establish the connections desired, the data to be transferred is placed by the equipment 12 on the B channel through the circuit 18. The B channel furnishes this information to a digital-to-analog/analog-to-digital circuit 30 to produce the appropriate data stream of analog signals. The circuit 30 may in the preferred embodiment be a eight bit eight kilohertz digital-to-analog/analog-to-digital converter such as the AM 79C04/A manufactured by AMD. These signals are transferred to the circuit 26 which shifts the level of the signals for transfers to the analog circuitry to provide the necessary protection for the analog system and by the transformer 28 to the equipment 13.

In the other direction, the data from the analog equipment 13 is transferred by the transformer 28 to the data access arrangement circuit 26 to the circuit 30. In the circuit 30, the analog signals are converted by the analog-to-digital channel to digital signals for transmission to the circuit 18 and the equipment 12.

Illustrated connected to the analog side of the circuit 10 is a telephone 33 which may be used with the system even though the information is being transferred both over an analog telephone line and to an ISDN terminal. The telephone 33 comprises the normal microphone, speaker and keypad used in a telephone system. The use of such a system is advantageous because it offers certain services such storage of information in any associated computer which are not available with a standard analog telephone system.

The telephone 33 is shown connected to a power fail transformer circuit 34 which is used to provide power in the event of the failure of local power. Such a circuit is the TN2E-5V manufactured by Omron. The power fail transformer circuit 34 also includes an Omron TN2E-5V switching circuit. This power furnished by the circuit 34 may be used when there is a failure of power at the location of the ISDN terminal to operate both the telephone 33 and the ISDN equipment 12 through the analog system.

The provision of the telephone and the second data channel allows the telephone to be answered when an operator is available or the call to be relayed through the data channel to the ISDN equipment in no operator is available. In such a case, the ISDN equipment functions as a telephone answering system for the analog line.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An interface for communicating between digital ISDN signals from an ISDN terminal and an analog telephone network, comprising:
   a first circuit for receiving first ISDN signals from said ISDN terminal and separating said ISDN signals into first digital control and first digital data signals;
   a second circuit for receiving said first digital control signals and translating said first digital control signals into first translation control signals;
   a DTMF transceiver coupled to receive said first translation control signals and generating first analog telephone tone control signals;
   a third circuit for receiving said first digital data signals and said first translation control signals, and translating said first digital data signals into first analog telephone data signals under the control of said first translation control signals;
   analog coupling means for coupling said first analog telephone tone control signals and said first analog data signals to said analog telephone network, and for receiving second analog data signals and second analog telephone tone control signals from said analog telephone network;
   said DTMF transceiver receiving said second analog telephone tone control signals and generating second translation control signals;

said second circuit receiving said second translation control signals and translating said second translation control signals into second digital control signals;

said third circuit receiving said second analog data signals and said second translation control signals, and translating said second analog data signals into second digital data signals, under the control of said second translation control signals;

said first circuit receiving said second digital data signals from said third circuit, and said second digital control signals from said second circuit, and combining said second digital control signals and said second digital data signals into second ISDN signals;

digital coupling means for coupling said second ISDN signals from said first circuit to said ISDN terminal.

2. The interface as defined by claim 1 wherein said first circuit comprises a voltage level changer.

3. The interface as defined by claim 2 wherein said second circuit comprises a microcontroller.

4. The interface as defined by claim 3 wherein said third circuit comprises a digital to analog converter for receiving said first digital data signals, and an analog to digital converter for receiving said second analog data signals.

5. The interface as defined by claim 4 wherein said analog coupling means includes a first transformer.

6. The interface as defined by claim 5 wherein said digital coupling means includes a second transformer.

7. The interface as defined by claim 6 further including a power fail transformer circuit coupled to said first transformer.

8. The interface as defined by claim 7 further including a telephone coupled to said power fail transformer.

* * * * *